US012103046B1

(12) United States Patent
Chen

(10) Patent No.: US 12,103,046 B1
(45) Date of Patent: Oct. 1, 2024

(54) ADJUSTABLE STATIC CLASSIFIER

(71) Applicant: Schenck Process LLC, Kansas City, MO (US)

(72) Inventor: Michael Chen, Naperville, IL (US)

(73) Assignee: Coperion Process Solutions LLC, Kansas City, MO (US)

( * ) Notice: Subject to any disclaimer, the term of this patent is extended or adjusted under 35 U.S.C. 154(b) by 0 days.

(21) Appl. No.: 18/120,094

(22) Filed: Mar. 10, 2023

(51) Int. Cl.
*B07B 7/04* (2006.01)

(52) U.S. Cl.
CPC .................................... *B07B 7/04* (2013.01)

(58) Field of Classification Search
CPC ................................ B07B 7/04; B07B 11/04
USPC ............................................... 209/138, 154
See application file for complete search history.

(56) References Cited

U.S. PATENT DOCUMENTS 2,108,609 A 2/1938 O'Mara
4,266,673 A * 5/1981 Haidlen ................ B07B 11/04 209/139.1
5,957,300 A * 9/1999 Nardi ..................... B07B 7/083 209/714
8,136,746 B2 * 3/2012 Martin ................... B07B 7/086 241/291
8,800,777 B2 * 8/2014 Schneider ................ B07B 4/08 209/139.1
8,813,967 B2 * 8/2014 Plant ........................ B07B 7/02 209/139.1
8,915,373 B2 * 12/2014 Lin ..................... B65G 53/528 209/139.1
9,981,290 B2 * 5/2018 Goosen .................. B07B 7/086
10,493,463 B2 * 12/2019 Bianca ................... B02C 23/12
2005/0242008 A1 * 11/2005 Simpson .................. B04C 5/04 209/717

* cited by examiner

*Primary Examiner* — Michael McCullough
*Assistant Examiner* — Molly K Devine
(74) *Attorney, Agent, or Firm* — Robinson & Cole LLP

(57) ABSTRACT

A static classifier including a vessel having an inlet and an outlet and having a vessel interior area. A classifier chamber is positioned in the vessel interior area. The classifier chamber has a plurality of openings extending through a side wall of the classifier chamber and into a classifier interior area of the classifier chamber. The plurality of openings are configured for passing particles entrained in a gas from the vessel interior area into the classifier interior area. One or more flow restrictors are arranged with the classifier chamber. The flow restrictors are configured to establish an optimal flow velocity and direction of the particles entrained in the gas, through the static classifier.

49 Claims, 19 Drawing Sheets

ADJUSTABLE STATIC CLASSIFIER

TECHNICAL FIELD

The present invention is directed to a static classifier for a grinding mill system, the static classifier being configured for separating ground or pulverized particles of different sizes and having multiple flow restrictor means for adjusting the flow velocity of particles entrained in a gas therethrough to maintain a steep particle separation.

BACKGROUND

Grinding mills are used to crush and pulverize solid materials such as minerals, limestone, gypsum that is used in the production of stucco, phosphate rock, salt, biomass, coke, and coal into small particles. Impact hammer mill and ball race mills are typical grinding mills that can be used to crush, pulverize, dry and flash calcining certain kind of solid materials such as gypsum all in one step. Ground particles of various sizes are discharged from the grinding mills into a downstream classifier. One prior art classifier is known as a "whizzer separator" as disclosed in U.S. Pat. No. 2,108,609. Another classifier is a turbine classifier. One of the prior art classifiers may be employed for the classification of the fine particles.

The efficiency of a classifier depends upon the air flow through the classifier and the type of material being classified. Prior art static classifiers are limited to a specific air flow and velocity of the air based upon the physical structure of the classifier. Thus, different classifiers are typically used for classifying different materials and a single classifier cannot be employed for classifying a wide range of different materials, for example natural gypsum and synthetic gypsum (FGD). To produce the same amount of stucco for wall board production, calcining FGD requires much more airflow than calcining natural gypsum due to higher moisture level in the feed. Over the last 10 years, the gypsum source has been changing greatly due to coal fired power plant being shut down in western countries. At the same time, in the developing countries, the coal fired power plants are still being built and more FGD feed will be available in the future. Therefore, an ideal new calcining system needs to be able to handle wide variation of feed type and airflow rate.

Thus, there is a need for an improved classifier that addresses the foregoing problems.

SUMMARY

There is disclosed herein, a static classifier that includes a vessel that has an inlet and an outlet and has a vessel interior area. The static classifier includes a classifier chamber that is positioned in the vessel interior area. The classifier chamber has a plurality of openings extending through a side wall of the classifier chamber and into a classifier interior area of the classifier chamber. The plurality of openings are each configured for passing particles entrained in a gas from the vessel interior area into the classifier interior area. The static classifier includes one or more flow restrictors arranged with the classifier chamber. The one flow restrictor is configured to establish a flow velocity of the particles entrained in the gas, through the static classifier. Each of the plurality of openings has an axial extent. The classifier chamber includes a classifier outlet connected to an outlet duct. The flow restrictor includes a sleeve moveably positioned in the outlet duct and a distal end of the sleeve extends into the classifier interior area and partially eclipses the axial extent.

In certain embodiments, the static classifier includes an actuator system that is in communication with the sleeve. The actuator system is configured to axially position the sleeve relative to the plurality of openings.

In certain embodiments, the actuator system is mounted to an outer portion of the outlet duct and a portion of the actuator system extends through a slot in the outlet duct and is secured to the sleeve.

In certain embodiments, the static classifier includes a first seal that has a portion thereof radially positioned between the sleeve and the outlet duct and axially located below the slot and a second seal that has a portion thereof radially positioned between the sleeve and the outlet duct and axially located above the slot.

In certain embodiments, the actuator system is a rack and pinion device.

In certain embodiments, the actuator system includes a first actuator positioned on a first side of the duct and a second actuator positioned on a second side of the duct. The first actuator and the second actuator are synchronously coupled to axially move the sleeve.

In certain embodiments, the first actuator is a first screw jack and the second actuator is a second screw jack. The synchronously coupling system includes: (i) a driver gear box coupled to the first screw jack via a first linkage; (ii) a driven gear box coupled to the second screw jack via a second linkage; and (iii) a third linkage coupling the driver gear box to the driven gear box.

In certain embodiments, the first actuator is a first linear actuator and the second actuator is a second linear actuator. The first linear actuator and the second linear actuator are synchronously coupled via an electronic system.

In certain embodiments, a second flow restrictor the static classifier includes a vane pivotally arranged to the side wall of the classifier chamber proximate each of the plurality of openings.

In certain embodiments, each of the plurality of openings has an axial extent and a circumferential extent and the vane has an axial length about equal to the axial extent. The vane has a circumferential arc-length that is about equal to the circumferential extent.

In certain embodiments, there is vane-actuator system in communication with the vanes.

In certain embodiments, the classifier chamber has a top-plate secured thereto. Each of the vanes is pivotally mounted on a shaft which extends through the top-plate. The vane-actuator system includes a linkage system connected to each of the shafts and a vane actuator connected to the linkage system. The vane actuator is configured to synchronously pivot the vanes relative to the side wall of the classifier chamber.

In certain embodiments, the vane actuator includes a lever for manual operation or a motor for electric powered operation of the vane actuator.

There is disclosed herein a static classifier that includes a vessel that has an inlet and an outlet and has a vessel interior area. The static classifier includes a classifier chamber positioned in the vessel interior area. The classifier chamber has a plurality of openings that extend through a side wall of the classifier chamber and into a classifier interior area of the classifier chamber. The plurality of openings are configured for passing particles entrained in a gas from the vessel interior area into the classifier interior area. The static classifier includes a first flow restrictor and a second flow restrictor each which are arranged with the classifier chamber. The first flow restrictor and the second flow restrictor each are configured to establish a flow velocity of the particles entrained in the gas, through the static classifier. The first flow restrictor includes one or more vanes that are pivotally arranged to the side wall of the classifier chamber, proximate each of the plurality of openings. The second flow restrictor includes one or more covers each of which are removably secured over one or more of the plurality of openings.

In certain embodiments, each of the plurality of openings has an axial extent and a circumferential extent. A respective one of the covers extends across the circumferential extent and partially across the axial extent of one or more of the plurality of openings.

In certain embodiments, each of the plurality of openings has an axial extent and a circumferential extent. Each of the vanes has an axial length that is about equal to the axial extent and has a circumferential arc-length that is about equal to the circumferential extent.

In certain embodiments, the static classifier includes a vane-actuator system that is in communication with the vanes.

In certain embodiments, the classifier chamber has a top-plate secured thereto. Each of the vanes is pivotally mounted on a shaft which extends through the top-plate. The vane-actuator system includes a linkage system that is connected to each of the shafts. A vane actuator is connected to the linkage system. The vane actuator is configured to synchronously pivot the vanes relative to the side wall of the classifier chamber.

In certain embodiments, the vane actuator includes a lever for manual operation or a motor for electric powered operation of the vane actuator.

In certain embodiments, each of the plurality of openings has an axial extent. The classifier chamber includes a classifier outlet that is connected to an outlet duct. The static classifier further includes a third flow restrictor that is configured as a sleeve that is moveably positioned in the outlet duct and a distal end of the sleeve extends into the classifier interior area and partially eclipses the axial extent.

In certain embodiments, an actuator system is in communication with the sleeve. The actuator system is configured to axially position the sleeve relative to the plurality of openings.

In certain embodiments, the actuator system is mounted to an outer portion of the outlet duct and a portion (e.g., an arm) of the actuator system extends through a slot in the outlet duct and is secured to the sleeve.

In certain embodiments, a first seal has a portion thereof radially positioned between the sleeve and the outlet duct and is axially located below the slot and a second seal has a portion thereof radially positioned between the sleeve and the outlet duct and is axially located above the slot.

In certain embodiments, the actuator system is a rack and pinion device.

In certain embodiments, the actuator system includes a first actuator positioned on a first side of the duct and a second actuator positioned on a second side of the duct. The first actuator and the second actuator are synchronously coupled to axially move the sleeve.

In certain embodiments, the first actuator is a first screw jack and the second actuator is a second screw jack. The synchronously coupling system includes: (i) a driver gear box that is coupled to the first screw jack via a first linkage; (ii) a driven gear box coupled to the second screw jack via a second linkage; and (iii) a third linkage coupling the driver gear box to the driven gear box.

In certain embodiments, the first actuator includes a first linear actuator and the second actuator includes a second linear actuator. The first linear actuator and the second linear actuator are synchronously coupled via an electronic system.

There is disclosed herein a static classifier including a vessel having an inlet and an outlet and having a vessel interior area. A classifier chamber is positioned in the vessel interior area. The classifier chamber has a plurality of openings extending through a side wall of the classifier chamber and into a classifier interior area of the classifier chamber. The plurality of openings are configured for passing particles entrained in a gas from the vessel interior area into the classifier interior area. At least one flow restrictor is arranged with the classifier chamber. The at least one flow restrictor is configured to establish a flow velocity and direction of the particles entrained in the gas, inside the static classifier.

In certain embodiments, the at least one flow restrictor includes a cover removably secured over a respective one of the plurality of openings. In some embodiments, each of the plurality openings has a cover secured thereover.

In certain embodiments, each of the plurality of openings has an axial extent and a circumferential extent and each of the at least one covers extends across the circumferential extent and partially across the axial extent.

In certain embodiments, each of the plurality of openings has an axial extent and the classifier chamber includes a classifier outlet connected to an outlet duct. The at least one flow restrictor comprises a sleeve moveably positioned in the outlet duct and a distal end of the sleeve extends into the classifier interior area and partially eclipses the axial extent.

In certain embodiments, a single actuator system is in communication with the sleeve, and the actuator system is configured to axially position the sleeve relative to the plurality of openings. In certain embodiments, two or more actuator systems (e.g., four actuators) are in communication with the sleeve, and the actuator systems are configured to axially position the sleeve relative to the plurality of openings.

In certain embodiments, the actuator system is mounted to an outer portion of the outlet duct and a portion of the actuator system extends through a slot in the outlet duct and is secured to the sleeve.

In certain embodiments, the static classifier includes a first seal having a portion thereof radially positioned between the sleeve and the outlet duct and axially located below the slot, and a second seal having a portion thereof radially positioned between the sleeve and the outlet duct and axially located above the slot.

In certain embodiments, the actuator system includes a single rack and pinion device. In certain embodiments, the actuator system includes two or more rack and pinion devices.

In certain embodiments, the actuator system includes a first actuator positioned on a first side of the duct and a second actuator positioned on a second side of the duct. The first actuator and the second actuator are synchronously coupled to axially move the sleeve.

In certain embodiments, the first actuator includes a first screw jack and the second actuator includes a second screw jack. The synchronously coupling includes: (i) a driver gear box coupled to the first screw jack via a first linkage; (ii) a driven gear box coupled to the second screw jack via a second linkage; and (iii) a third linkage coupling the driver gear box to the driven gear box.

In certain embodiments, the first actuator includes a first linear actuator and the second actuator comprises a second linear actuator. The first linear actuator and the second linear actuator are synchronously coupled and the synchronously coupling is electronic.

In certain embodiments, the at least one flow restrictor comprises a vane pivotally arranged to the side wall of the classifier chamber proximate each of the plurality of openings.

In certain embodiments, each of the plurality of openings has an axial extent and a circumferential extent and wherein the vane has an axial length about equal to the axial extent and a circumferential arc-length about equal to the circumferential extent.

In certain embodiments, the static classifier includes a vane-actuator system in communication with the vanes.

In certain embodiments, the classifier chamber has a top-plate secured thereto, each of the vanes being pivotally mounted on a shaft which extends through the top-plate. The vane-actuator system includes a linkage system connected to each of the shafts and a vane actuator connected to the linkage system. The vane actuator is configured to synchronously pivot the vanes relative to the side wall of the classifier chamber.

In certain embodiments, the vane actuator includes a motor.

In certain embodiments, the sleeve has an outside diameter and an outer edge of the vanes defines a reference circle (R) which has a reference diameter when the vanes extended to a maximum radially inward position. The outside diameter is less than the reference diameter so that the distal end of the sleeve is spaced apart from the vanes when the sleeve extends into the classifier interior area and partially eclipses the axial extent.

In certain embodiments, the sleeve has an outside diameter and an outer edge of the vanes define a reference circle which has a reference diameter when the vanes extend to a maximum radially inward position. The outside diameter is less than the reference diameter so that the distal end of the sleeve is spaced apart from the vanes when the sleeve extends into the classifier interior area and partially eclipses the axial extent.

In certain embodiments, three flow restrictors are employed including the covers, the sleeve, and the vanes.

In certain embodiments, only two flow restrictors are employed namely, the sleeve and the vanes.

In certain embodiments, only two flow restrictors namely, the covers and the vanes.

DETAILED DESCRIPTION

Figure 1:
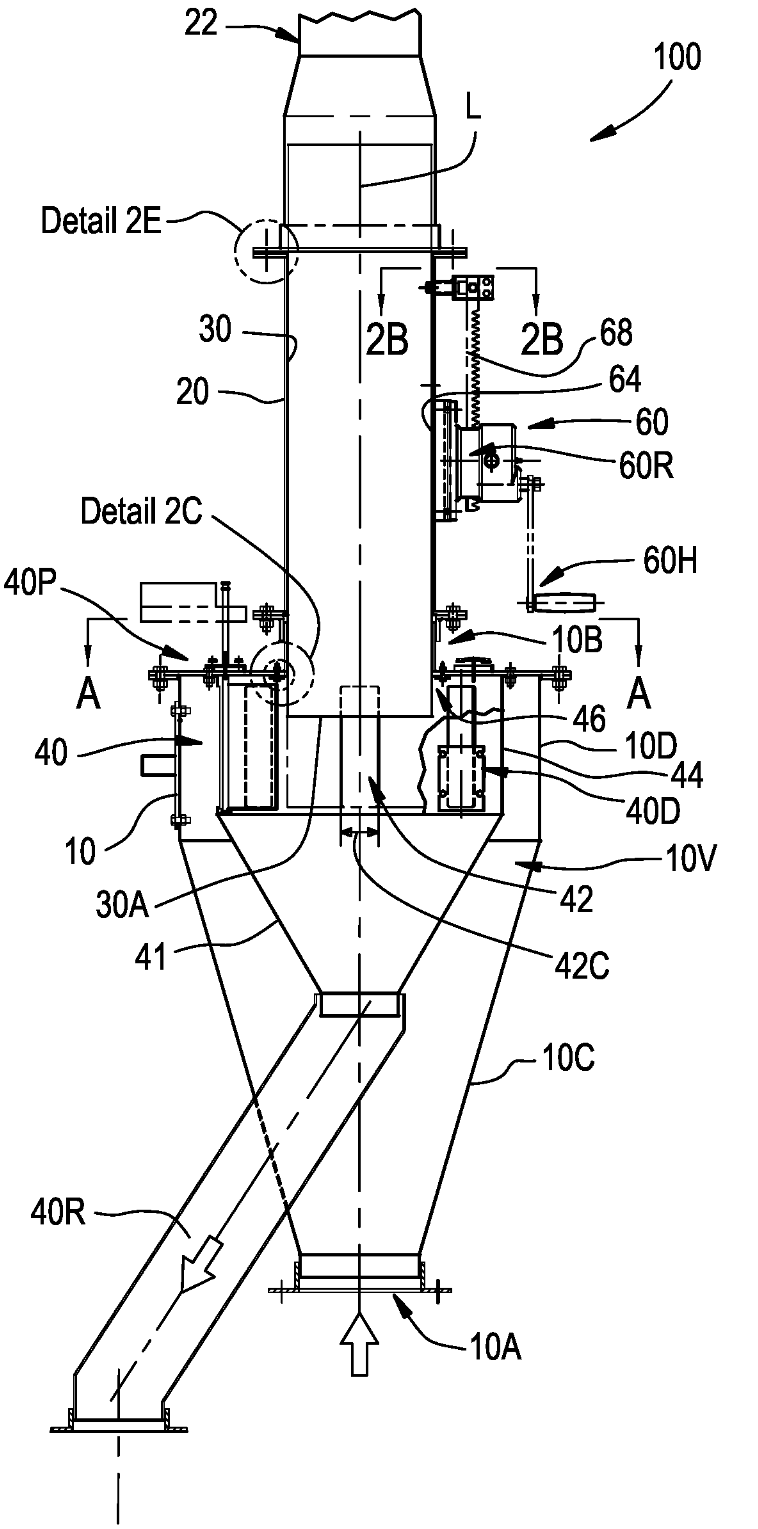
FIG. 1 is a cross sectional view of the static classifier of the present invention using a single actuator for the sleeve movement.

As shown in FIG. 1, a static classifier of the present invention is generally designated by the numeral 100. The static classifier 100 includes a vessel 10 that has an inlet 10A and an outlet 10B and has a vessel interior area 10V. The vessel 10 includes an upper drum 10D that transitions into a lower cone 10C that tapers inwardly to the inlet 10A.

The static classifier 100 includes a classifier chamber 40 (e.g., an outlet sleeve) positioned in the vessel interior area 10V inside the upper drum 10D. The classifier chamber 40 has a plurality of openings 42 (e.g., windows) that extend through a side wall 44 of the classifier chamber 40 and into a classifier interior area 40D of the classifier chamber 40. The plurality of openings 42 are configured for passing particles entrained in a gas from the vessel interior area 10V into the classifier interior area 40D.

The static classifier 100 includes one or more flow restrictors arranged with the classifier chamber 40, as described further herein. Each of the flow restrictors are configured to establish a flow velocity and or direction of the particles entrained in the gas through the static classifier 100. The number and type of flow restrictors used depends upon the required particle size and the system air flow.

The static classifier 100 of the present invention has utility in being able to separate large particles from the small ones. The flow restrictors help optimize the classification efficiency and maintain the efficiency when system flow rate changes significantly due to process requirements change.

The upper drum 10D of the classifier chamber 40 has a top-plate 40P secured thereto. The classifier chamber 40 has a classifier outlet 46 formed in the top-plate 40P. The classifier outlet 46 is connected to an outlet duct 20 (e.g., an uptake duct) through which fine classified particles entrained in the gas flow and discharged therefrom via a duct outlet 22.

Figure 6:
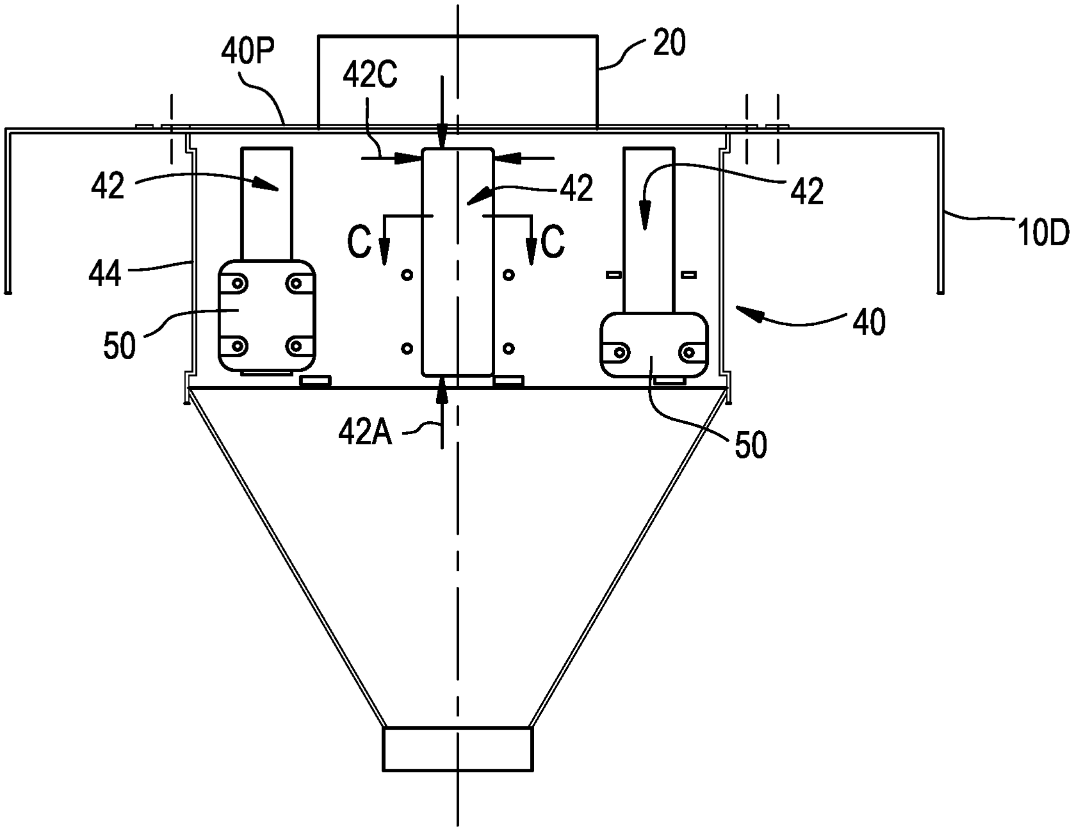
FIG. 6 is a front view of a portion of the static classifier of FIG. 1 shown with two covers positioned over openings in the classifier chamber.
Figure 7:
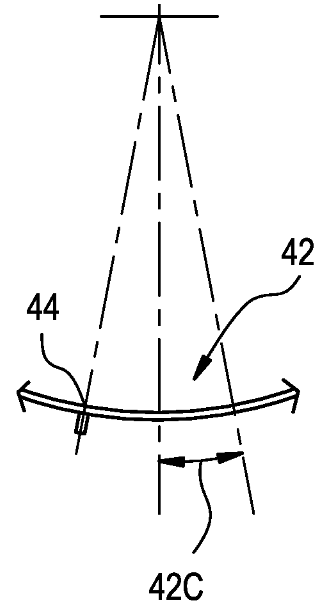
FIG. 7 is a top sectional view of the opening in the classifier chamber taken across section C-C of FIG. 6.
Figure 8A:
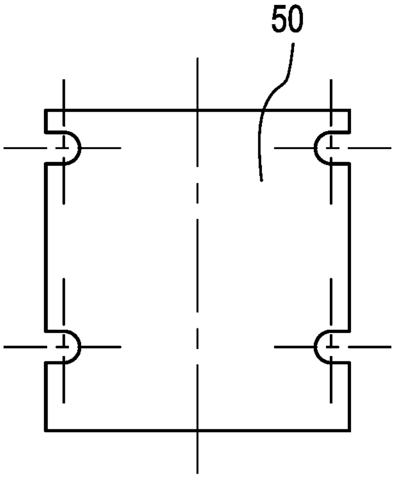
FIG. 8A is a front view of a large cover shown in FIG. 6.
Figure 8B:
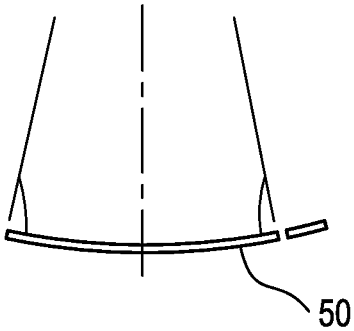
FIG. 8B is a top sectional view of the cover of FIG. 8A.
Figure 9A:
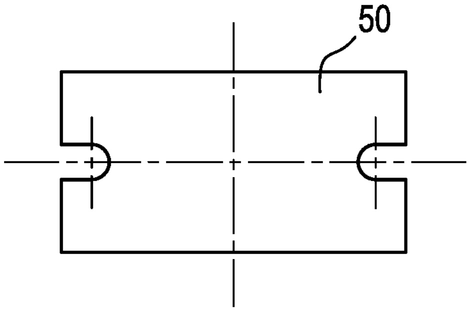
FIG. 9A is a front view of a small cover shown in FIG. 6.
Figure 9B:
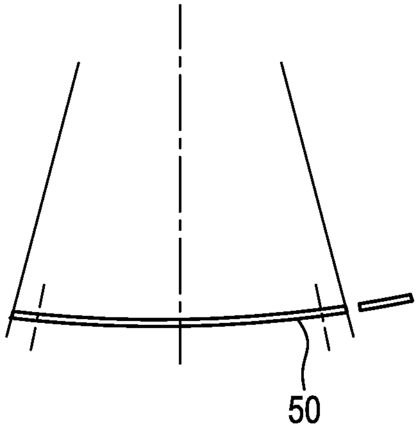
FIG. 9B is a top sectional view of the cover of FIG. 9A.

As shown in the embodiment of FIG. 6, the flow restrictors are in the form of covers 50 that are removably secured (e.g., bolted to) to the side wall 44 of the classifier chamber 40 and are positioned over a portion of two of the plurality of openings 42. Each of the plurality of openings 42 has an axial extent 42A and a circumferential extent 42C. Each of the covers 50 extends across the circumferential extent 42C and partially across the axial extent 42A. For example, one of the covers 50 (the one on the left-hand side of FIG. 6) extends across a greater percentage of the axial extent than does the other cover 50 (the one on the right-hand side of FIG. 6). While only two covers 50 are shown positioned over a respective one of the openings 42, the present invention is not limited in this regard as the cover 50 can be bigger or smaller than shown here depending on the flow velocity and particle separation size required and each of the openings 42 may have a cover 50 secured thereto. In some embodiments, the cover 50 extends across two or more of the openings 42 or all of the openings.

Figure 2A:
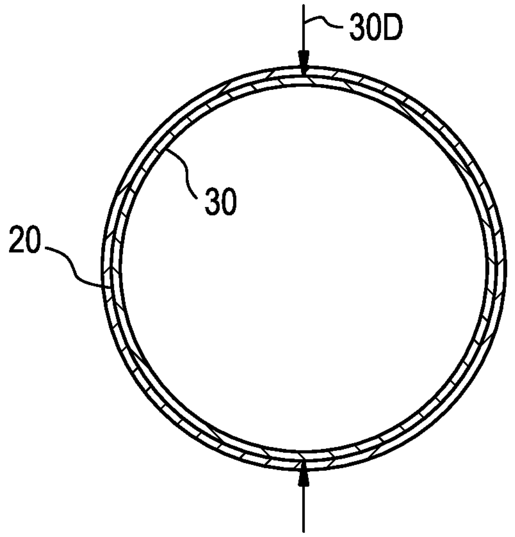
FIG. 2A is a top sectional view of the static classifier of FIG. 1 taken across section A-A.
Figure 2B:
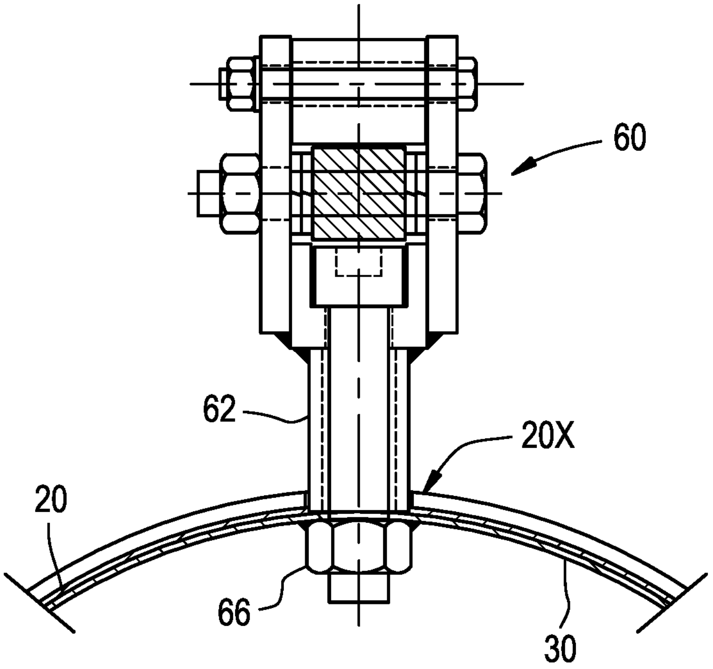
FIG. 2B is a top sectional view of the static classifier of FIG. 1 taken across section B-B.

As shown in the embodiment of FIGS. 1, 2A, and 2B a flow restrictor is in the form of a sleeve 30 that is axially (along longitudinal axis L) moveably positioned in the outlet duct 20 and a distal end 30A of the sleeve 30 extends into the classifier interior area 40D and partially eclipses an upper portion of the axial extent 42A of the openings 42. An actuator system 60 is in communication with the sleeve (30), for example a portion of the actuation system is bolted to the sleeve 30 with a suitable fastener 66. The actuator system 60 is configured to axially position the sleeve 30 relative to the plurality of openings 42. The actuator system 60 is mounted to an outer portion of the outlet duct 20 with a suitable fastening system 64. and a portion (e.g., actuator arm 62) of the actuator system 60 extends through a longitudinal slot 20X in the outlet duct 20 and is secured to the sleeve 30, as shown in FIG. 2B. In the embodiment shown in FIGS. 1 and 2B, the actuator system 60 is a rack and pinion device 60R with a rack 68 and a hand crank 60H.

Figure 2C:
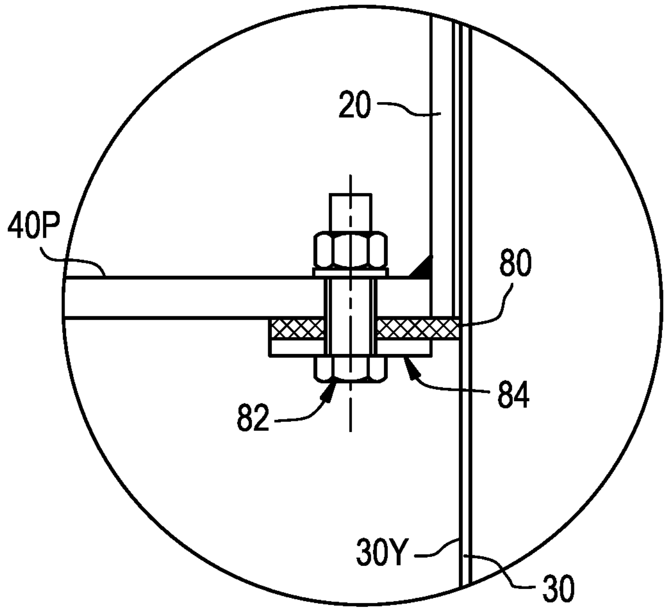
FIG. 2C is an enlarged sectional view of Detail 2C of FIG. 1, of the lower seal.
Figure 2D:
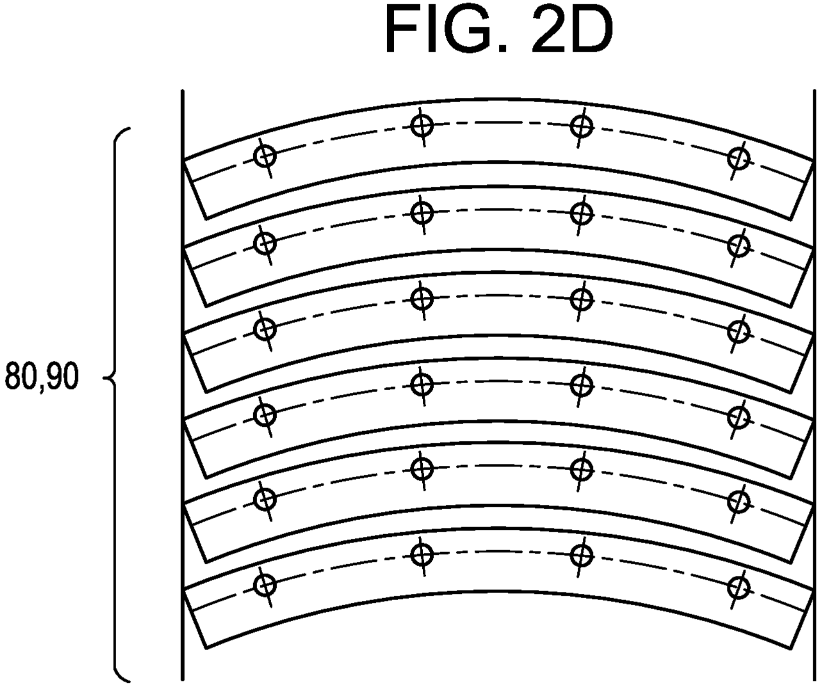
FIG. 2D is a top view of a segmented seal for use in the static classifier of FIGS. 11 and 12.

As shown in FIG. 2C, a first seal 80 has a portion thereof radially positioned between the sleeve 30 and the outlet duct 20 and axially located below the slot 20X. The first seal 80 is secured to the top plate 40P, inside the upper drum 10D, by a plurality of fasteners 82 and a washer system 84. The first seal 80 projects radially inward from the top plate 40P and sealingly engages an outside surface 30Y of the sleeve 30 as the outside surface 30Y slidingly engages the seal 80. In some embodiments, the first seal 80 is segmented and has multiple pieces as shown in FIG. 2D. In some embodiments, the second seal 80 is a complete circular piece as shown in FIG. 2F. In some embodiments, the first seal is high temperature resistant gasket material such as graphite, a silicone or fluoroelastomer (e.g., Viton®) material.

Figure 2E:
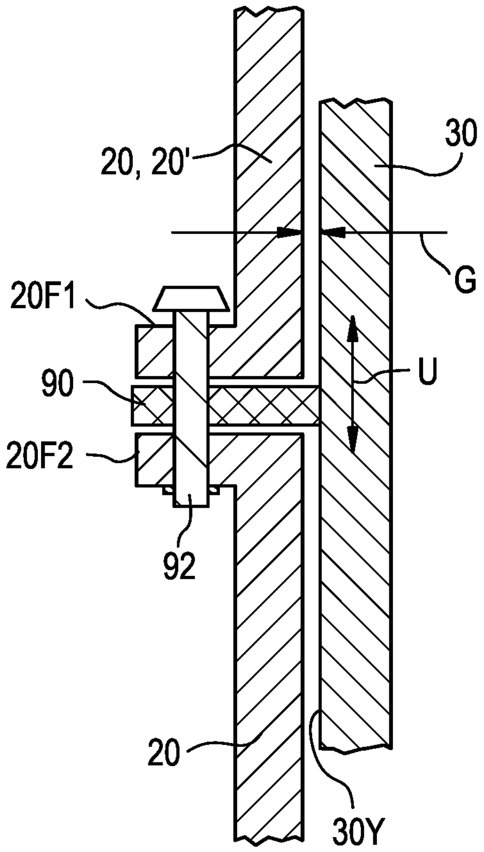
FIG. 2E is an enlarged sectional view of Detail 2E of FIG. 1 of the upper seal and of the upper and lower seal of FIG. 2G.
Figure 2F:
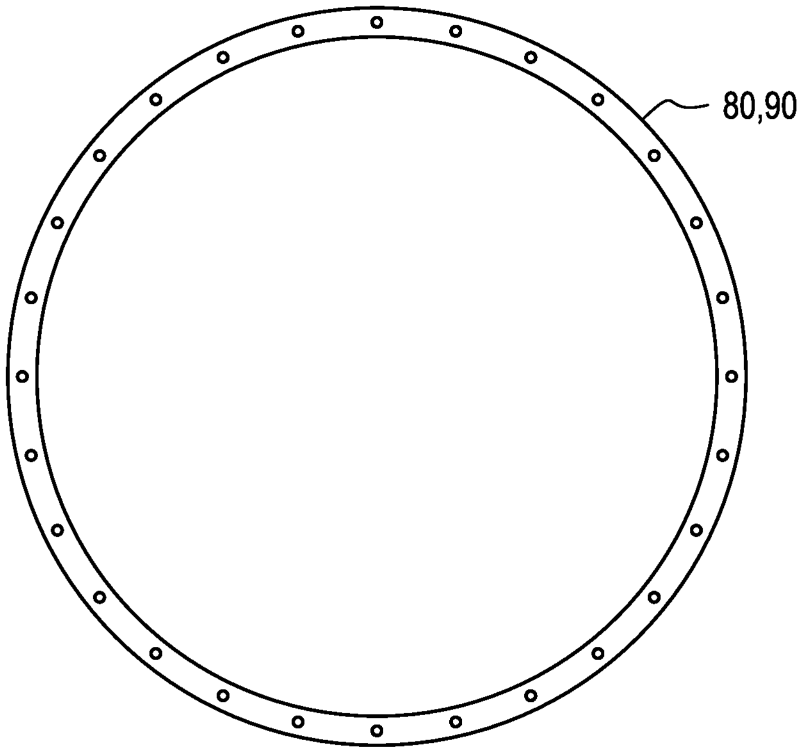
FIG. 2F is a top view of a complete circular seal for use in the upper and/or lower seal configurations of Detail 2E of FIG. 1 and Detail 2C of FIG. 1.

As shown in FIG. 2E, a second seal 90 has a portion thereof radially positioned between the sleeve 30 and the outlet duct 20 and axially located above the slot 20X. The outlet duct 20 has a first flange 20F1 and a second flange 20F2 with the second seal 90 secured therebetween by a plurality of fasteners 92. A portion of the seal 90 (stationary seal) projects radially inward from the outlet duct 20 and sealing engages the outside surface 30Y of the sleeve 30 as the outside surface slidingly engages the seal 90. In some embodiments, the second seal 90 is segmented and has multiple pieces as shown in FIG. 2D. In some embodiments, the second seal 90 is a complete circular piece. In some embodiments, the first seal is high temperature resistant gasket material such as graphite, a silicone or fluoroelastomer (e.g., Viton®) material. The seals 80, 90 have utility in preventing leakage of the ambient airflow from entering into the gas through the slot 20X when the system is operating under a negative pressure. The seals 80, 90 also prevents the process particle flow leaking out to the ambient if the system is operating under positive pressure.

Figure 2G:
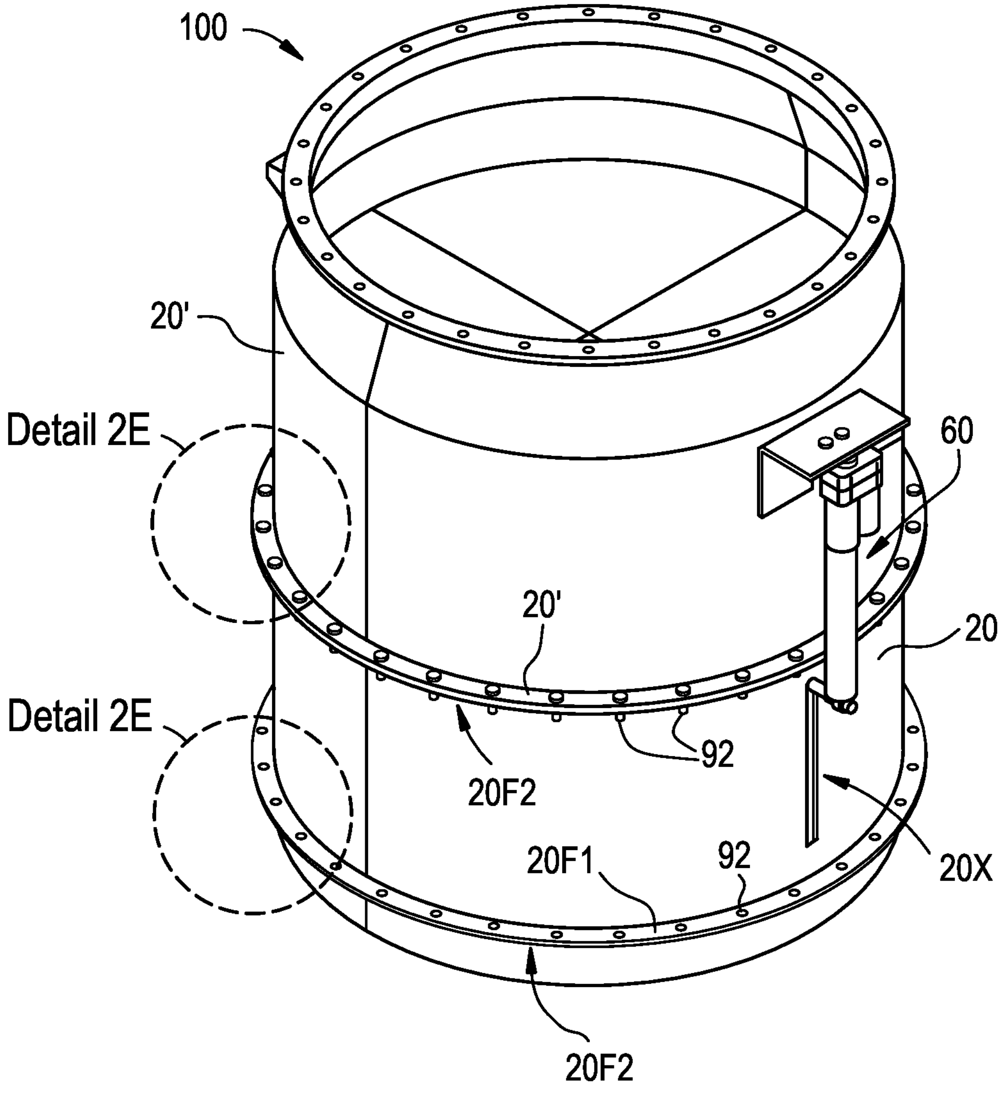
FIG. 2G is a perspective view of another embodiment of a multi-piece outlet duct with a slot extending therethrough.

In some embodiments, the seal 80 is eliminated and replaced with the seal 90 and flanges 20F1, 20F2 shown in FIG. 2C on a multi-piece outlet duct, 20, 20', as shown in FIG. 2G.

Figure 11A:
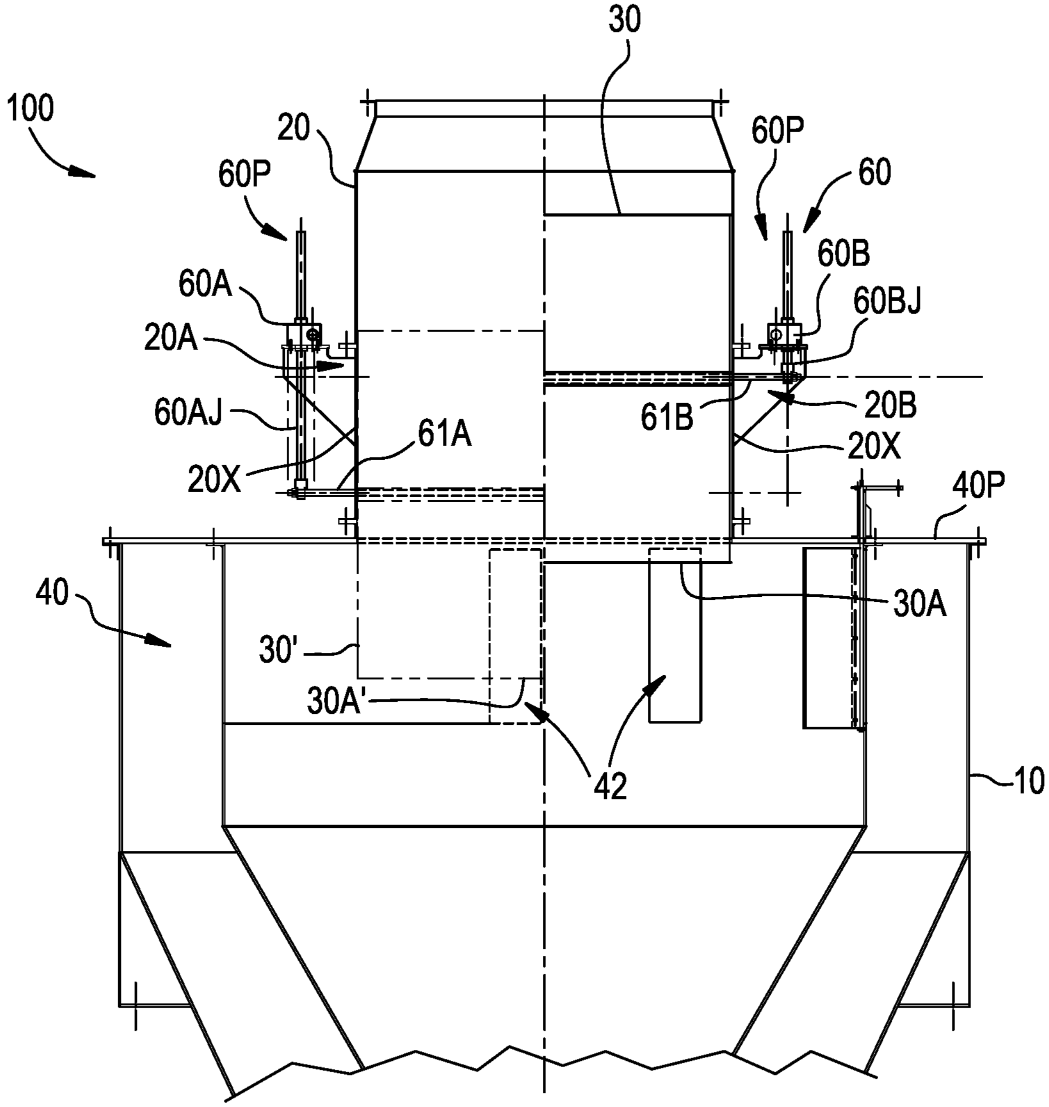
FIG. 11A is a cross sectional view of a portion of the static classifier of a large size classifier shown with two screw jack actuators in communication with the sleeve half of which is shown extended and the other half shown retracted.
Figure 11B:
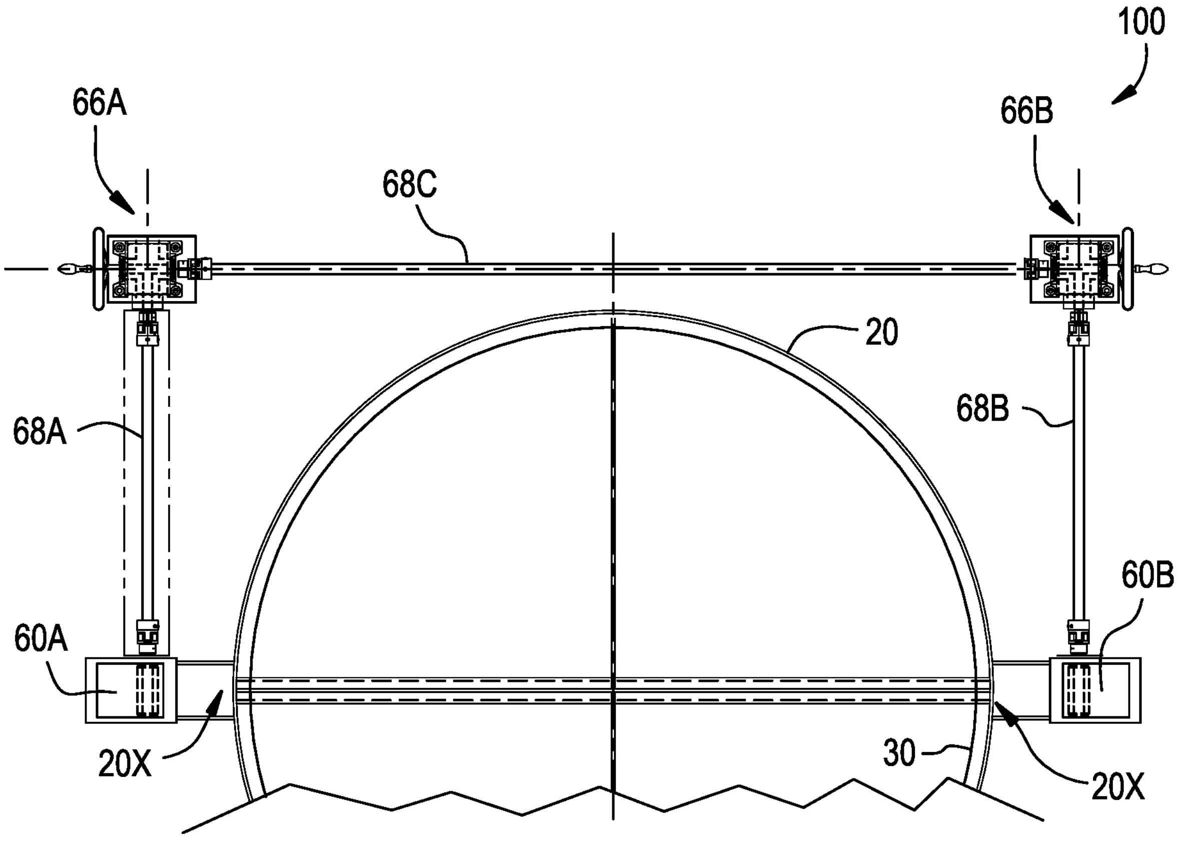
FIG. 11B is a top view of the two screw jacks and static classifier of FIG. 11A.

While FIGS. 1 and 2B show a rack and pinion 60R actuator system 60, the present invention is not limited in this regard as other actuation systems 60 are included in the present invention. For example, as shown in FIG. 11A the actuation system 60 includes to a first actuator 60A and a second actuator 60B. The first actuator 60A is positioned on a first side 20A of the duct 20 and a second actuator 60B positioned on a second side 20B of the duct 20. In some embodiments, the first actuator 60A and the second actuator 60B are screw jacks. As shown in FIG. 11B the first actuator 60A and the second actuator 60B are synchronously coupled to axially move the sleeve 30. The first actuator 60A and the second actuator 60B are synchronously coupled via a driver gear box 66A coupled to the first actuator 60A via a first linkage 68A; a driven gear box 66A coupled to the second actuator 60B via a second linkage 68A; and a third linkage 68C coupling the driver gear box 66A to the driven gear box 66B.

As shown in FIG. 11B, the driver gear box 66A is driven by a hand crank or motor and synchronously rotates the first linkage 68A and the third linkage 68C. The rotation of the third linkage 68C rotates the second linkage 68B via the second gear box 66B. Rotation of the first linkage 68A causes the first actuator 60A to extend or retract a first actuator rod 60AJ arranged therewith. Rotation of the second linkage 68B causes the second actuator 60B to extend or retract a second actuator rod 60BJ arranged therewith. The first actuator rod 60AJ has a first connector arm 61A that extends through the slot 20X slot in the outlet duct 20 and is secured to the sleeve 30. The second actuator rod 60BJ has a second connector arm/rod 61B that extends through the slot 20X in the outlet duct 20 and is extended through the whole diameter of the sleeve 30. Each of the first actuator rod 60AJ and the second actuator rod 60BJ are protected by a respective pipe 60P (see FIG. 11A) which has diameter is slightly larger than the first actuator rod 60AJ and the second actuator rod 60BJ. The first actuator rod 60AJ and the second actuator rod 60BJ move synchronously. For clarity, the left-hand side of FIG. 11A shows the first actuator rod 60AJ extended outwardly from the first actuator 60A thereby extending the distal end 30A' of the sleeve 30' downward to eclipse a portion of the opening 42. The right-hand side of FIG. 11A shows the second actuator rod 60BJ retracted into the second actuator 60B thereby moving the distal end 30A of the sleeve 30 upward thereby uncovering the opening 42.

Figure 12A:
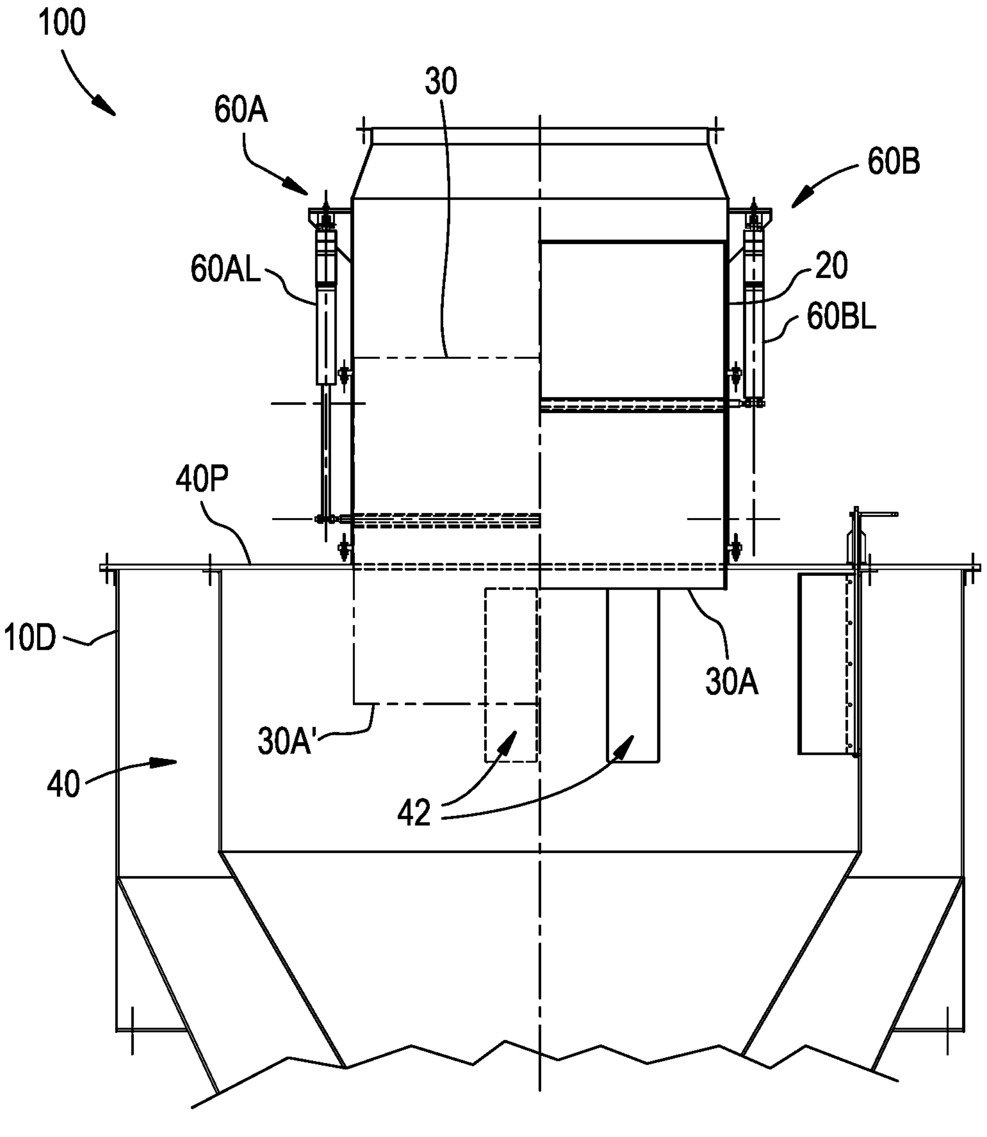
FIG. 12A is a cross sectional view of a portion of the static classifier of a large size classifier shown with two linear actuators in communication with the sleeve.
Figure 12B:
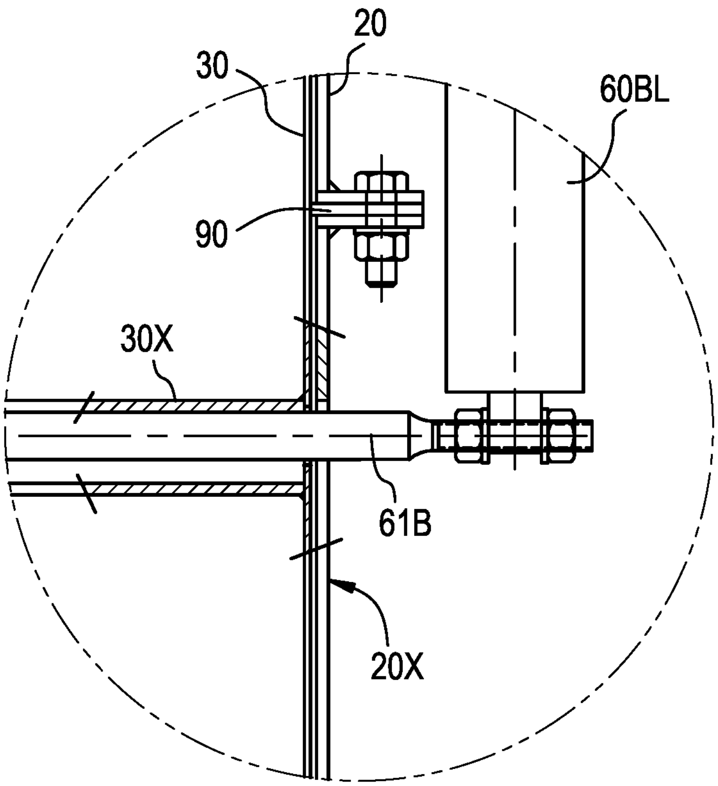
FIG. 12B is an enlarged view of detail 12B of FIG. 12A.

As shown in FIG. 12A, the first actuator 60A is a first linear actuator 60AL and the second actuator 60B is a second linear actuator 60BL. The first linear actuator 60AL and the second linear actuator 60BL are electronically synchronously coupled to one another so as to extend and retract synchronously. As shown in FIG. 2B, the linear actuator 60BL has a connector arm 61B extending there from and communicating with (e.g., extending into) a cross member (e.g., tube) 30X which is secured to the sleeve 30. The cross member 30X extends across the sleeve 30 and is secured to an opposing inside wall of the sleeve 30. The connector arm 61B extends through the cross member 30X and is secured to the first linear actuator 60AL.

Figure 4:
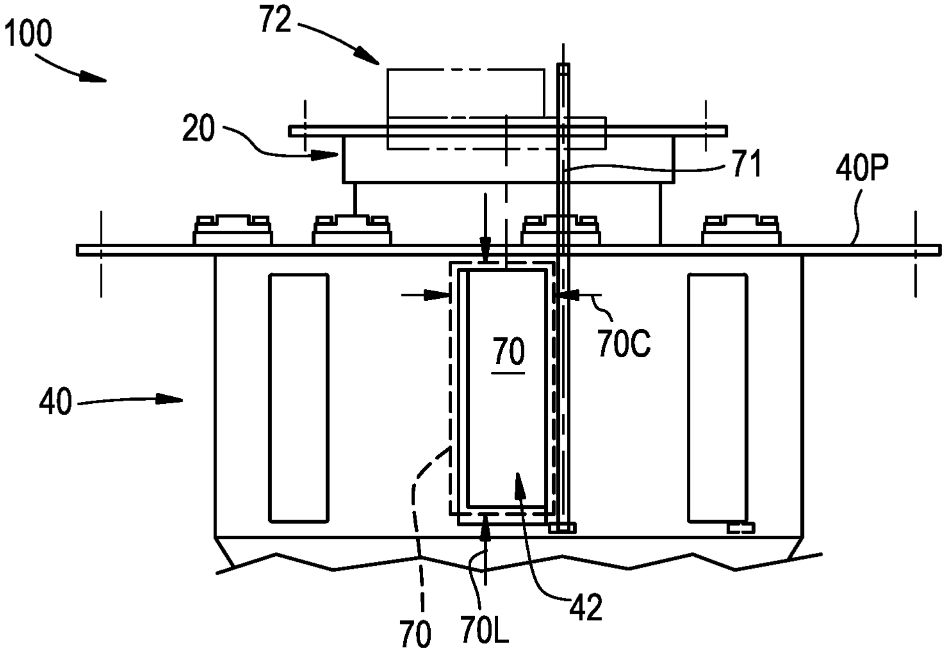
FIG. 4 is a front view of a portion of the static classifier of FIG. 1.
Figure 5:
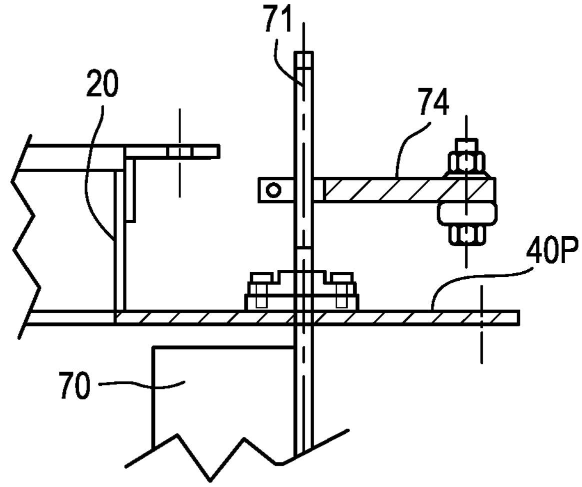
FIG. 5 is an enlarged view of a portion of the static classifier taken across section A-A of FIG. 3.

As shown in FIGS. 4 and 5, the flow restrictor is in the form of a vane 70 (e.g., having an arcuate profile) pivotally mounted (e.g., mounted on a shaft 71) adjacent to the side wall 44 of the classifier chamber 40 proximate each of the plurality of openings 42. The vane 70 has an axial length 70L that is about equal to the axial extent 42A of the opening 42 and the vane 70 has a circumferential arc-length 70C that is about equal to the circumferential extent 42C of the opening 42. The control rod 71 extends out of the classifier chamber 40 and through the top plate 40P. While the first linear actuator 60AL and the second actuator 60B are shown and described more than two actuators (e.g., 3, 4 or more) actuators may be employed.

Figure 3:
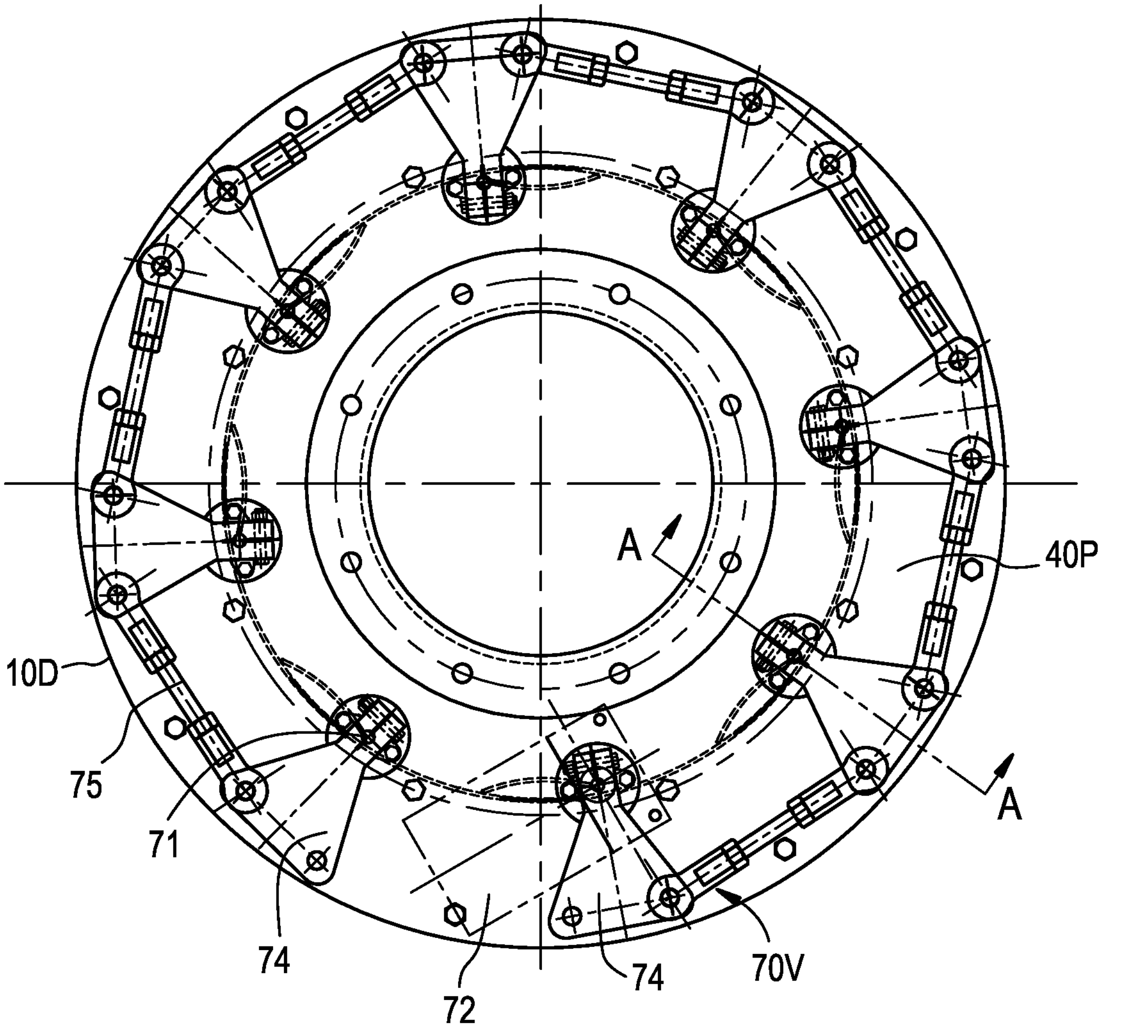
FIG. 3 is a top view of the static classifier of FIG. 1.
Figure 10A:
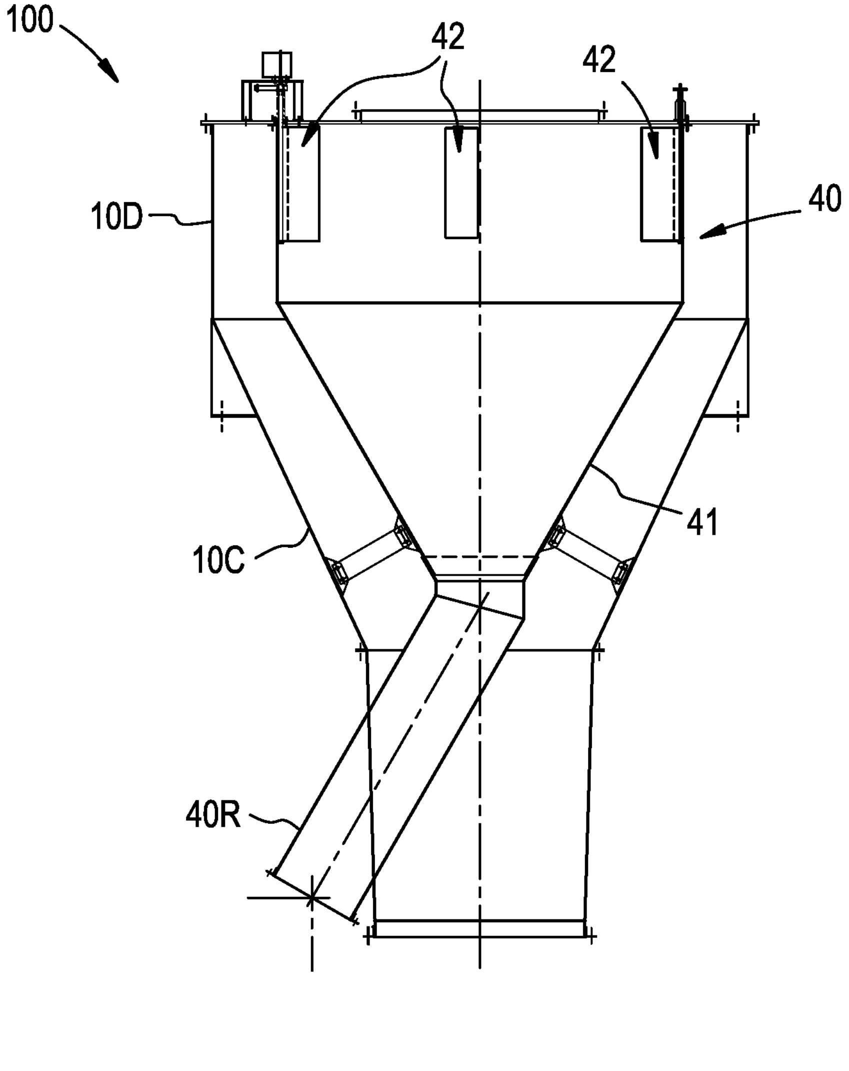
FIG. 10A is a front view of a portion of static classifier similar to that shown in FIG. 1, but of a larger size.
Figure 10B:
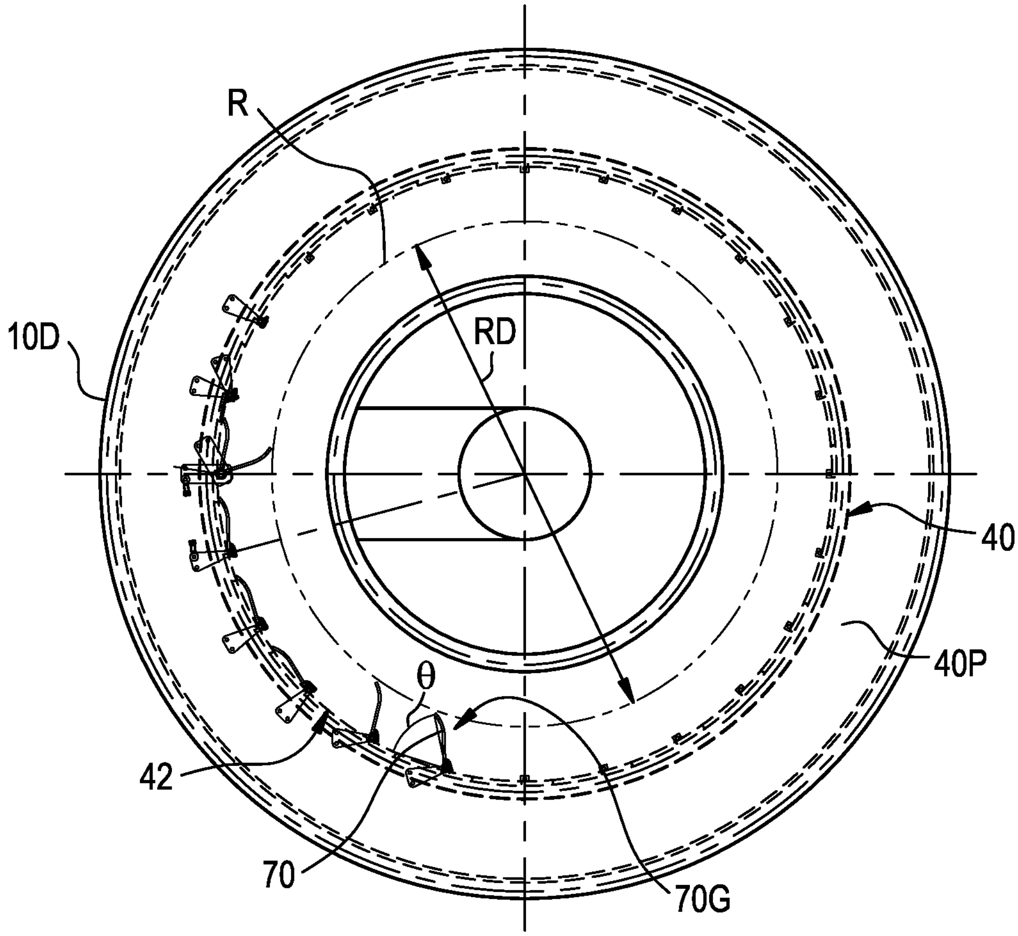
FIG. 10B is a top view of a portion of the static classifier of FIG. 10A shown with the vanes in various pivoted positions.
Figure 10C:
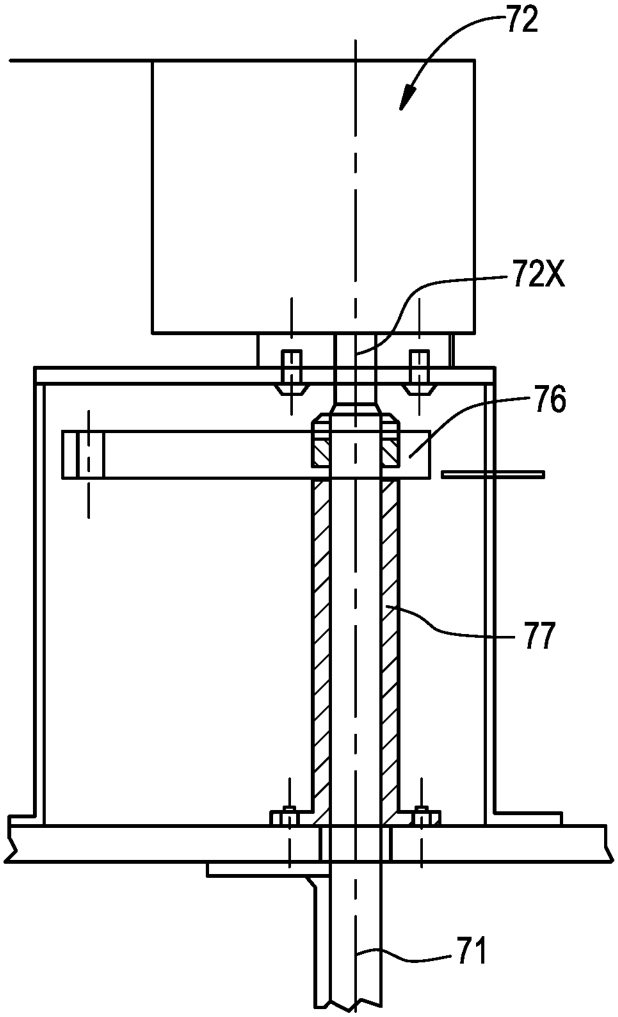
FIG. 10C is an enlarged sectional view of a motor and actuator of one of the vanes of a large size classifier.
Figure 10D:
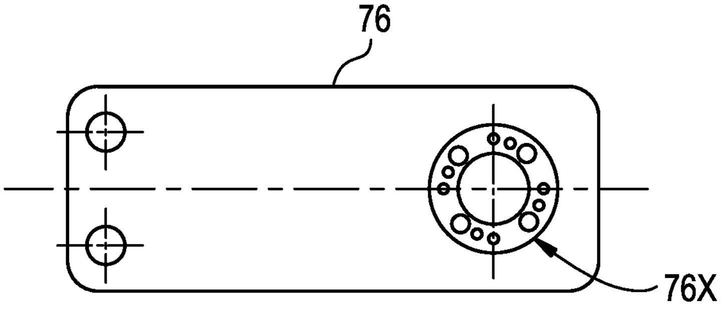
FIG. 10D is a top view of a linkage plate for the actuator of FIG. 10C.
Figure 10E:
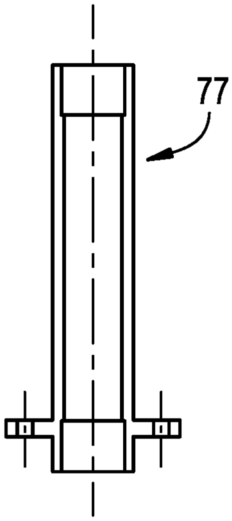
FIG. 10E is a connector tube for the actuator of FIG. 10C.
Figure 10F:
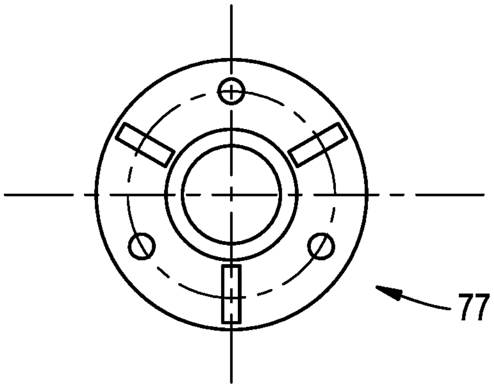
FIG. 10F is a top view of the connector tube of FIG. 10E.

As shown in FIGS. 3, 10C, and 1D, a vane-actuator system 70V in communication with the vanes 70. The vane-actuator system 70V includes a linkage system which has a connector plate 74 connected to each of the shafts 71 and a linkage rod 75 connecting adjacent connector plates 74. A vane actuator 72 has an actuator shaft 72X that is connected to the one of the shafts 71 via expandable bushing 76X mounted in an actuator lever 76. The connector plate 74 attached to the shaft 71 that has the vane actuator 72 thereon is only connected to one adjacent connector plate 74 by a respective one of the linkage rods 75. As shown in FIG. 3, the there is no linkage rod 75 between the shaft 71 positioned to the left-hand side of the shaft 71 with the vane actuator 72 thereon. The shaft 71 is supported in a mounting sleeve 77 via bearings housed therein. The mounting sleeve 77 is secured to the top plated 40P. The vane actuator 72 is configured to synchronously pivot the vanes 70 relative to the side wall 44 of the classifier chamber 40 to adjust the magnitude of the flow of the particles entrained in the gas through the openings 42. The vane actuator 72 includes a motor or a hand crank. The connector plates 74 are shown for example as being generally triangular. However, in some embodiments the connector plates may have a rectangular shape 76 as show for example in FIG. 10D. The connector plate 75 has utility for use on the shaft 71 that has the vane actuator thereon to provide greater load carrying capability, that the other triangular shaped connector plates 74.

As shown in FIG. 2A, the sleeve 30 has an outside diameter 30D. As shown in FIG. 10B an outer edge 70G of the vanes 70 define a reference circle R which has a reference diameter RD when the vanes 70 extended to a maximum radially inward position. The outside diameter 30D is less than the reference diameter RD, so that the distal end 30A of the sleeve 30 is spaced apart from the vanes 70, when the sleeve 30 extends into the classifier interior area 40D and partially eclipses the axial extent 42A.

Figure 13:
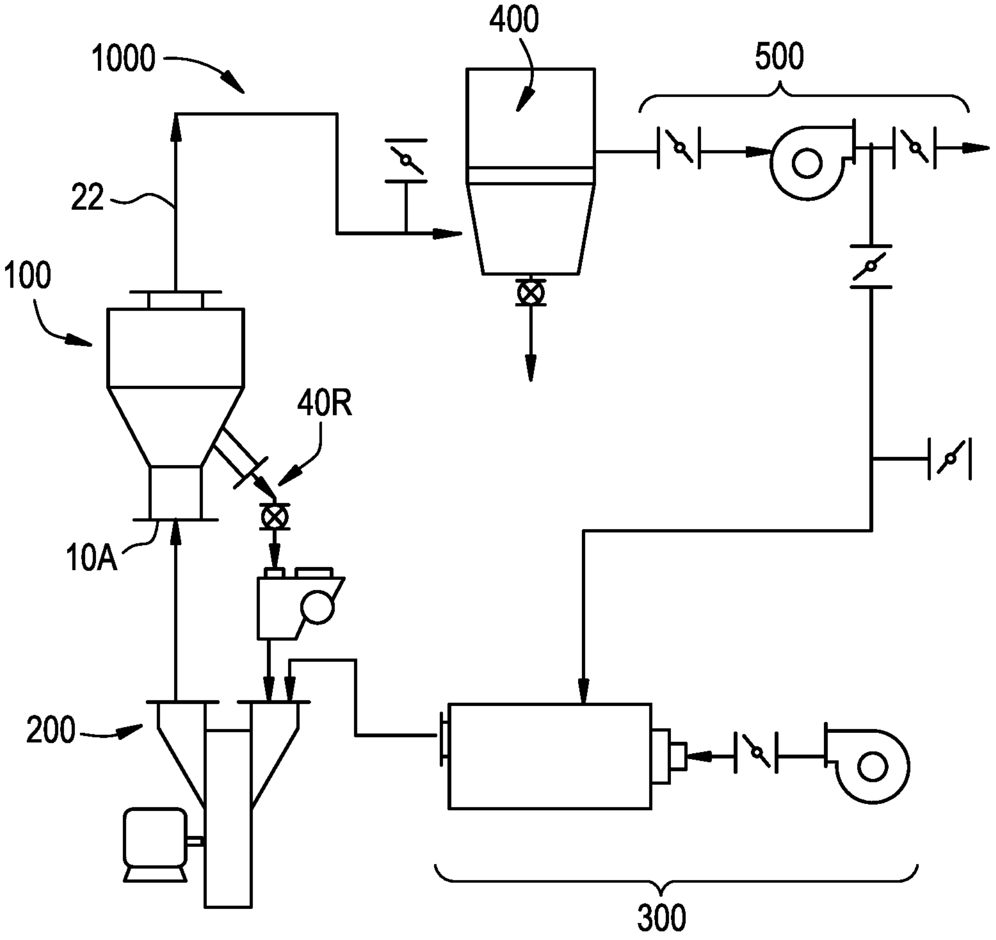
FIG. 13 is a schematic view of the static classifier in a pulverizer system.

The static classifier 100 has utility in pulverizer mill system 1000, as shown in FIG. 13. The pulverize system 1000 includes a grinding mill 200 (e.g., an impact mill) that feed pulverized particles entrained in a gas to the static classifier 100 via an inlet duct 10A from an upstream blower and air heater system 300. The coarse rejects are classified out in the classifier chamber 40 and returned to the grinding mill 200 via a return duct 40R. The classified fine particles are conveyed to a dust collector 400 with the assistance of a fan system 500.

In some embodiments, the static classifier 100 includes three types of the flow restrictors including the covers 50, the moveable sleeve 30 and the adjustable vanes 70.

In some embodiments, the static classifier 100 includes only two types of the flow restrictors namely, the sleeve 30 and the adjustable vanes 70.

In some embodiments, the static classifier 100 includes only two types of the flow restrictors namely, the covers 50 and the adjustable vanes 70.

The following clauses that are listed as items represent embodiments of the present invention.

Item 1. A static classifier (100) comprising: a vessel (10) having an inlet (10A) and an outlet (10B) and having a vessel interior area (10V); a classifier chamber (40) positioned in the vessel interior area (10V), the classifier chamber (40) having a plurality of openings (42) extending through a side wall (44) of the classifier chamber (40) and into a classifier interior area (40D) of the classifier chamber (40), the plurality of openings (42) being configured for passing particles entrained in a gas from the vessel interior area (10V) into the classifier interior area (40D); and at least one flow restrictor arranged with the classifier chamber (40); wherein the at least one flow restrictor is configured to establish a flow velocity of the particles entrained in the gas, through the static classifier (100).

Item 2. The static classifier (100) of item 1, wherein the at least one flow restrictor comprises at least one cover (50) removably secured over at least one of the plurality of openings (42).

Item 3. The static classifier (100) of item 2, wherein each of the plurality of openings (42) has an axial extent (42A) and a circumferential extent (42C) and wherein a respective one of the at least one covers (50) extends across the circumferential extent (42C) and partially across the axial extent (42A) of a respective one of the plurality of openings (42).

Item 4. The static classifier (100) of item 1, wherein each of the plurality of openings (42) has an axial extent (42A) and wherein the classifier chamber (40) comprises a classifier outlet (46) connected to an outlet duct (20); and wherein the at least one flow restrictor comprises a sleeve (30) moveably positioned in the outlet duct (20) and a distal end (30A) of the sleeve (30) extending into the classifier interior area (40D) and partially eclipses the axial extent (42A).

Item 5. The static classifier (100) of claim 4, further comprising an actuator system (60) in communication with the sleeve (30), wherein the actuator system (60) is configured to axially position the sleeve (30) relative to the plurality of openings (42).

Item 6. The static classifier (100) of item 5, wherein the actuator system (60) is mounted to an outer portion of the outlet duct (20) and a portion of the actuator system (60) extends through a slot (20X) in the outlet duct (20) and is secured to the sleeve (30).

Item 7. The static classifier (100) of claim 6, further comprising a first seal (80) having a portion thereof radially positioned between the sleeve (30) and the outlet duct (20) and axially located below the slot (20X) and a second seal (90) having a portion thereof radially positioned between the sleeve (30) and the outlet duct (20) and axially located above the slot (20X).

Item 8. The static classifier (100) of item 5, wherein the actuator system (60) comprises a rack and pinion device (60R).

Item 9. The static classifier (100) of item 5, wherein the actuator system (60) comprises a first actuator (60A) positioned on a first side (20A) of the duct (20) and a second actuator (60B) positioned on a second side (20B) of the duct (20), wherein the first actuator (60A) and the second actuator (60B) are synchronously coupled to axially move the sleeve (30).

Item 10. The static classifier (100) of item 9, wherein the first actuator (60A) comprises a first screw jack and the second actuator (60B) comprises a second screw jack and wherein the synchronously coupling comprises: (i) a driver gear box (66A) coupled to the first screw jack (60AJ) via a first linkage (68A); (ii) a driven gear box (66A) coupled to the second screw jack (60BJ) via a second linkage (68A); and (iii) a third linkage (68C) coupling the driver gear box (66A) to the driven gear box (66B).

Item 11. The static classifier (100) of item 5, wherein the first actuator (60A) comprises a first linear actuator (60AL) and the second actuator (60B) comprises a second linear actuator (60BL) and wherein first linear actuator (60AL) and the second linear actuator (60BL) are synchronously coupled and wherein the synchronously coupling is electronic.

Item 12. The static classifier (100) of item 1, wherein the at least one flow restrictor comprises a vane (70) pivotally arranged to the side wall (44) of the classifier chamber (40) proximate each of the plurality of openings (42).

Item 13. The static classifier (100) of item 12, wherein each of the plurality of openings (42) has an axial extent (42A) and a circumferential extent (42C) and wherein the vane (70) has an axial length (70L) about equal to the axial extent (42A) and a circumferential arc-length (70C) about equal to the circumferential extent (42C).

Item 14. The static classifier (100) of item 12, further comprising vane-actuator system (70V) in communication with the vanes (70).

Item 15. The static classifier (100) of item 14, wherein the classifier chamber (40) has a top-plate (40P) secured thereto, each of the vanes (70) being pivotally mounted on a shaft (77) which extends through the top-plate (40P), the vane-actuator system (70V) comprises a linkage system (70L) connected to each of the shafts (77) and a vane actuator (70VA) connected to the linkage system (70L), the vane actuator (70VA) being configured to synchronously pivot the vanes (70) relative to the side wall (44) of the classifier chamber (40).

Item 16. The static classifier (100) of item 15, wherein the vane actuator (70VA) comprises a lever for manual operation or a motor for electric powered operation of the vane actuator.

Item 17. A static classifier (100) of item, comprising: (a) at least one cover (50) of item 2 and optionally item 3 removably secured over at least one of the plurality of openings (42); (b) a sleeve (30) of item 4 and optionally any of items 5-11 and wherein each of the plurality of openings (42) has an axial extent (42A) and wherein the classifier chamber (40) comprises a classifier outlet (46) connected to an outlet duct (20); and the sleeve (30) is moveably positioned in the outlet duct (20) and a distal end (30A) of the sleeve (30) extends into the classifier interior area (40D) and partially eclipses the axial extent (42A); and (c) a vane (70) of item 12 and optionally any of items 13-16 pivotally arranged to the side wall (44) of the classifier chamber (40) proximate each of the plurality of openings (42).

Item 18. The static classifier (100) of item 17, wherein the sleeve (30) has an outside diameter (30D) and an outer edge (70G) of the vanes (70) define a reference circle (R) which has a reference diameter (RD) when the vanes (70) extended to a maximum radially inward position and the outside diameter (30D) is less than the reference diameter, so that the distal end (30A) of the sleeve (30) is spaced apart from the vanes (70), when the sleeve (30) extends into the classifier interior area (40D) and partially eclipses the axial extent (42A).

Item 19. A static classifier (100) of item 1, comprising: (a) a sleeve (30) of item 4 and optionally any of items 5-11 and wherein each of the plurality of openings (42) has an axial extent (42A) and wherein the classifier chamber (40) comprises a classifier outlet (46) connected to an outlet duct (20); and the sleeve (30) is moveably positioned in the outlet duct (20) and a distal end (30A) of the sleeve (30) extends into the classifier interior area (40D) and partially eclipses the axial extent (42A); and (b) a vane (70) of item 12 and optionally any of items 13-16 pivotally arranged to the side wall (44) of the classifier chamber (40) proximate each of the plurality of openings (42).

Item 20. The static classifier (100) of item 19, wherein the sleeve (30) has an outside diameter (30D) and an outer edge (70G) of the vanes (70) define a reference circle (R) which has a reference diameter (RD) when the vanes (70) extended to a maximum radially inward position and the outside diameter (30D) is less than the reference diameter, so that the distal end (30A) of the sleeve (30) is spaced apart from the vanes (70), when the sleeve (30) extends into the classifier interior area (40D) and partially eclipses the axial extent (42A).

Item 21. A static classifier (100) of item 1, comprising: (a) at least one cover (50) of item 2 and optionally item 3 removably secured over at least one of the plurality of openings (42); and (b) a vane (70) of item 12 and optionally any of items 13-16 pivotally arranged to the side wall (44) of the classifier chamber (40) proximate each of the plurality of openings (42).

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of the appended claims.

What is claimed is:

1. A static classifier comprising:

a vessel having an inlet and a vessel outlet and having a vessel interior area, the vessel having a top-plate positioned on the vessel outlet and having a classifier outlet formed in the top-plate, and an outlet duct positioned on the classifier outlet and at least an outer-duct portion of the outlet duct extending outwardly from the top-plate;

a classifier chamber positioned in the vessel interior area, the classifier chamber having a plurality of openings extending through a side wall of the classifier chamber and into a classifier interior area of the classifier chamber, the plurality of openings being configured for passing particles entrained in a gas from the vessel interior area into the classifier interior area; and at least one flow restrictor arranged with the classifier chamber;

the at least one flow restrictor is configured to establish a flow velocity of the particles entrained in the gas, through the static classifier;

wherein each of the plurality of openings has an axial extent and wherein the at least one flow restrictor comprises a sleeve moveably positioned in the outer-duct portion of the outlet duct and a distal end of the sleeve being movably extendable into the classifier interior area and partially eclipses the axial extent;

an actuator system in communication with the sleeve, wherein the actuator system is configured to axially position the sleeve relative to the plurality of openings;

the actuator system being mounted to an outer circumferential side of the outer-duct portion of the outlet duct and a portion of the actuator system extends through a slot in the outer-duct portion of the outlet duct and is secured to a portion of the sleeve located in the outer-duct portion of the outlet duct; and a first seal having a portion thereof positioned between the sleeve and the outlet duct and located below the slot and a second seal having a portion thereof positioned between the sleeve and the outlet duct and located above the slot, wherein the sleeve is in axial sliding engagement with the first seal and the second seal in response to the actuator system axially positioning the sleeve relative to the plurality of openings.

2. The static classifier of claim 1, wherein the actuator system comprises a rack and pinion device.

3. The static classifier of claim 1, wherein the actuator system comprises a first actuator positioned on a first outer circumferential side of the outer-duct portion of the outlet duct and a second actuator positioned on a second outer circumferential side of the outer-duct portion of the outlet duct, wherein the first actuator and the second actuator are synchronously coupled to axially move the sleeve.

4. The static classifier of claim 3, wherein the first actuator comprises a first screw jack and the second actuator comprises a second screw jack and wherein the synchronously coupling comprises:

(i) a driver gear box coupled to the first screw jack via a first linkage;

(ii) a driven gear box coupled to the second screw jack via a second linkage; and (iii) a third linkage coupling the driver gear box to the driven gear box.

5. The static classifier of claim 1, wherein the first actuator comprises a first linear actuator and the second actuator comprises a second linear actuator and wherein the first linear actuator and the second linear actuator are synchronously coupled and wherein the synchronously coupling is electronic.

6. The static classifier of claim 1, further comprising a second flow restrictor comprising a vane pivotally arranged to and located radially inward of the side wall of the classifier chamber proximate each of the plurality of openings, wherein the vane is positioned radially outward of and axially aligned with an axial path of travel of a portion of the sleeve that partially eclipses the axial extent, and is located between the sleeve and the side wall.

7. The static classifier of claim 6, wherein each of the plurality of openings has an axial extent and a circumferential extent and wherein the vane has an axial length equal to the axial extent and a circumferential arc-length equal to the circumferential extent.

8. The static classifier of claim 6, further comprising vane-actuator system in communication with the vanes.

9. The static classifier of claim 8, wherein each of the vanes being pivotally mounted on a shaft which extends through the top-plate, the vane-actuator system comprises a linkage system connected to each of the shafts and a vane actuator connected to the linkage system, the vane actuator being configured to synchronously pivot the vanes relative to the side wall of the classifier chamber.

10. The static classifier of claim 8, wherein the vane actuator comprises a lever for manual operation or a motor for electric powered operation of the vane actuator.

11. The static classifier of claim 1, wherein the sleeve is continuously circular in cross section and has an outside diameter.

12. The static classifier of claim 1, wherein the slot comprises a linear axial opening in a circumferential outer wall of the outlet duct.

13. A static classifier comprising:

a vessel having an inlet and a vessel outlet and having a vessel interior area;

a classifier chamber positioned in the vessel interior area, the classifier chamber having a plurality of openings extending through a side wall of the classifier chamber and into a classifier interior area of the classifier chamber, the plurality of openings being configured for passing particles entrained in a gas from the vessel interior area into the classifier interior area; and a first flow restrictor and a second flow restrictor each being arranged with the classifier chamber;

the first flow restrictor and the second flow restrictor each being configured to establish a flow velocity of the particles entrained in the gas, through the static classifier; wherein the second flow restrictor comprises a vane pivotally arranged to the side wall of the classifier chamber proximate each of the plurality of openings; and the first flow restrictor comprises at least one cover removably secured over at least one of the plurality of openings, the at least one cover being located in the vessel interior area.

14. The static classifier of claim 13, wherein each of the plurality of openings has an axial extent and a circumferential extent and wherein a respective one of the at least one covers extends across the circumferential extent and partially across the axial extent of at least one of the plurality of openings.

15. The static classifier of claim 13, wherein each of the plurality of openings has an axial extent and a circumferential extent and wherein the vane has an axial length equal to the axial extent and a circumferential arc-length equal to the circumferential extent.

16. The static classifier of claim 13, further comprising vane-actuator system in communication with the vanes.

17. The static classifier of claim 16, wherein the vane actuator comprises a lever for manual operation or a motor for electric powered operation of the vane actuator.

18. The static classifier of claim 13, wherein the classifier chamber has a top-plate secured thereto, each of the vanes being pivotally mounted on a shaft which extends through the top-plate, the vane-actuator system comprises a linkage system connected to each of the shafts and a vane actuator connected to the linkage system, the vane actuator being configured to synchronously pivot the vanes relative to the side wall of the classifier chamber.

19. The static classifier of claim 13, wherein each of the plurality of openings has an axial extent and wherein the classifier chamber comprises a classifier outlet connected to an outlet duct; and further comprising a third flow restrictor comprising a sleeve moveably positioned in the outlet duct and a distal end of the sleeve extending into the classifier interior area and partially eclipses the axial extent.

20. The static classifier of claim 19, further comprising an actuator system in communication with the sleeve, wherein the actuator system is configured to axially position the sleeve relative to the plurality of openings.

21. The static classifier of claim 20, wherein the actuator system is mounted to an outer portion of the outlet duct and a portion of the actuator system extends through a slot in the outlet duct and is secured to the sleeve.

22. The static classifier of claim 21, further comprising a first seal having a portion thereof positioned between the sleeve and the outlet duct and located below the slot and a second seal having a portion thereof positioned between the sleeve and the outlet duct and located above the slot;

wherein the sleeve is in axial sliding engagement with the first seal and the second seal in response to the actuator system axially positioning the sleeve relative to the plurality of openings.

23. The static classifier of claim 21, wherein the slot comprises a linear axial opening in a circumferential outer wall of the outlet duct.

24. The static classifier of claim 20, wherein the actuator system comprises a rack and pinion device.

25. The static classifier of claim 20, comprising the vessel having a top-plate positioned on the vessel outlet and having a classifier outlet formed in the top-plate, and the outlet duct positioned on the classifier outlet and at least an outer-duct portion of the outlet duct extending outwardly from the top-plate;

wherein the actuator system comprises a first actuator positioned on a first outer circumferential side of the outer-duct portion of the outlet duct and a second actuator positioned on a second outer circumferential side of the outer-duct portion of the outlet duct, wherein the first actuator and the second actuator are synchronously coupled to axially move the sleeve.

26. The static classifier of claim 25, wherein the first actuator comprises a first screw jack and the second actuator comprises a second screw jack and wherein the synchronously coupling comprises:

(i) a driver gear box coupled to the first screw jack via a first linkage;

(ii) a driven gear box coupled to the second screw jack via a second linkage; and (iii) a third linkage coupling the driver gear box to the driven gear box.

27. The static classifier of claim 20, wherein the first actuator comprises a first linear actuator and the second actuator comprises a second linear actuator and wherein first linear actuator and the second linear actuator are synchronously coupled and wherein the synchronously coupling is electronic.

28. The static classifier of claim 13, wherein each of the at least one covers extends circumferentially around the classifier and each of the at least one covers having a cover-circumference that is less than a classifier-circumference of the classifier chamber.

29. The static classifier of claim 28, wherein a difference between a sum of the cover-circumference of all of the at least one covers and the classifier-circumference defines a distance, the distance being greater than zero.

30. The static classifier of claim 13, wherein each of the at least one covers is configured to selectively extend across a single one of the plurality of openings and two or more of the plurality of openings.

31. The static classifier of claim 13, wherein each of the at least one covers comprises a fastener arrangement that removably secures individual ones of the at least one cover to the side wall.

32. A static classifier comprising:

a vessel having an inlet and an outlet and having a vessel interior area;

a classifier chamber positioned in the vessel interior area, the classifier chamber having a plurality of openings extending through a side wall of the classifier chamber and into a classifier interior area of the classifier chamber, the plurality of openings being configured for passing particles entrained in a gas from the vessel interior area into the classifier interior area; and at least one flow restrictor arranged with the classifier chamber;

the at least one flow restrictor is configured to establish a flow velocity of the particles entrained in the gas, through the static classifier;

wherein each of the plurality of openings has an axial extent and wherein the classifier chamber comprises a classifier outlet connected to an outlet duct; and wherein the at least one flow restrictor comprises a sleeve moveably positioned in the outlet duct and a distal end of the sleeve extending into the classifier interior area and partially eclipses the axial extent;

an actuator system in communication with the sleeve, wherein the actuator system is configured to axially position the sleeve relative to the plurality of openings;

wherein the actuator system comprises a first actuator positioned on a first side of the duct and a second actuator positioned on a second side of the duct;

wherein the first actuator and the second actuator are synchronously coupled to axially move the sleeve; and wherein the first actuator comprises a first screw jack and the second actuator comprises a second screw jack and wherein the synchronously coupling comprises:

(i) a driver gear box coupled to the first screw jack via a first linkage;

(ii) a driven gear box coupled to the second screw jack via a second linkage; and (iii) a third linkage coupling the driver gear box to the driven gear box.

33. A static classifier comprising:

a vessel having an inlet and an outlet and having a vessel interior area;

a classifier chamber positioned in the vessel interior area, the classifier chamber having a plurality of openings extending through a side wall of the classifier chamber and into a classifier interior area of the classifier chamber, the plurality of openings being configured for passing particles entrained in a gas from the vessel interior area into the classifier interior area; and a first flow restrictor and a second flow restrictor each being arranged with the classifier chamber;

the first flow restrictor and the second flow restrictor each being configured to establish a flow velocity of the particles entrained in the gas, through the static classifier; wherein the second flow restrictor comprises a vane pivotally arranged to the side wall of the classifier chamber proximate each of the plurality of openings; and the first flow restrictor comprises at least one cover removably secured over at least one of the plurality of openings;

wherein each of the plurality of openings has an axial extent and wherein the classifier chamber comprises a classifier outlet connected to an outlet duct; and further comprising a third flow restrictor comprising a sleeve moveably positioned in the outlet duct and a distal end of the sleeve extending into the classifier interior area and partially eclipses the axial extent;

an actuator system in communication with the sleeve, wherein the actuator system is configured to axially position the sleeve relative to the plurality of openings; wherein the actuator system comprises a first actuator positioned on a first side of the duct and a second actuator positioned on a second side of the duct, wherein the first actuator and the second actuator are synchronously coupled to axially move the sleeve; and wherein the first actuator comprises a first screw jack and the second actuator comprises a second screw jack and wherein the synchronously coupling comprises:

(i) a driver gear box coupled to the first screw jack via a first linkage;

(ii) a driven gear box coupled to the second screw jack via a second linkage; and (iii) a third linkage coupling the driver gear box to the driven gear box.

34. The static classifier of claim 33, comprising the vessel having a top-plate positioned on the vessel outlet and having the classifier outlet formed in the top-plate, and the outlet duct positioned on the classifier outlet and at least an outer-duct portion of the outlet duct extending outwardly from the top-plate; and wherein each of the plurality of openings has an axial extent and wherein the classifier chamber comprises a classifier outlet connected to an outlet duct; and a third flow restrictor comprising a sleeve moveably positioned in the outer-duct portion of the outlet duct and a distal end of the sleeve being movably extendable into the classifier interior area and partially eclipses the axial extent.

35. The static classifier of claim 34, further comprising an actuator system in communication with the sleeve, wherein the actuator system is configured to axially position the sleeve relative to the plurality of openings.

36. The static classifier of claim 35, wherein the actuator system is mounted to an outer circumferential side of the outer-duct portion of the outlet duct and a portion of the actuator system extends through a slot in the outer-duct portion of the outlet duct and is secured to a portion of the sleeve located in the outer-duct portion of the outlet duct.

37. The static classifier of claim 36, wherein the slot comprises a linear axial opening in a circumferential outer wall of the outlet duct.

38. A static classifier comprising:

a vessel having an inlet and a vessel outlet and having a vessel interior area, the vessel having a top-plate positioned on the vessel outlet and having a classifier outlet formed in the top-plate, and an outlet duct positioned on the classifier outlet and at least an outer-duct portion of the outlet duct extending outwardly from the top-plate;

a classifier chamber positioned in the vessel interior area, the classifier chamber having a plurality of openings extending through a side wall of the classifier chamber and into a classifier interior area of the classifier chamber, the plurality of openings being configured for passing particles entrained in a gas from the vessel interior area into the classifier interior area; and at least one flow restrictor arranged with the classifier chamber;

the at least one flow restrictor is configured to establish a flow velocity of the particles entrained in the gas, through the static classifier;

wherein each of the plurality of openings has an axial extent and wherein the at least one flow restrictor comprises a sleeve moveably positioned in the outer-duct portion of the outlet duct and a distal end of the sleeve being movably extendable into the classifier interior area and partially eclipses the axial extent;

an actuator system in communication with the sleeve, wherein the actuator system is configured to axially position the sleeve relative to the plurality of openings;

the actuator system comprises a first actuator positioned on a first outer circumferential side of the outer-duct portion of the outlet duct and a second actuator positioned on a second outer circumferential side of the outer-duct portion of the outlet duct, wherein the first actuator and the second actuator are synchronously coupled to axially move the sleeve; and wherein the first actuator comprises a first screw jack and the second actuator comprises a second screw jack and wherein the synchronously coupling comprises:

(i) a driver gear box coupled to the first screw jack via a first linkage;

(ii) a driven gear box coupled to the second screw jack via a second linkage; and (iii) a third linkage coupling the driver gear box to the driven gear box.

39. The static classifier of claim 38, wherein the actuator system is mounted to an outer circumferential side of the outer-duct portion of the outlet duct and a portion of the actuator system extends through a slot in the outer-duct portion of the outlet duct and is secured to a portion of the sleeve located in the outer-duct portion of the outlet duct.

40. The static classifier of claim 39, further comprising a first seal having a portion thereof positioned between the sleeve and the outlet duct and located below the slot and a second seal having a portion thereof positioned between the sleeve and the outlet duct and located above the slot, wherein the sleeve is in axial sliding engagement with the first seal and the second seal in response to the actuator system axially positioning the sleeve relative to the plurality of openings.

41. The static classifier of claim 39, wherein the slot comprises a linear axial opening in a circumferential outer wall of the outlet duct.

42. The static classifier of claim 38, wherein the actuator system comprises a rack and pinion device.

43. The static classifier of claim 38, wherein the first actuator comprises a first linear actuator and the second actuator comprises a second linear actuator and wherein the first linear actuator and the second linear actuator are synchronously coupled and wherein the synchronously coupling is electronic.

44. The static classifier of claim 38, further comprising a second flow restrictor comprising a vane pivotally arranged to and located radially inward of the side wall of the classifier chamber proximate each of the plurality of openings, wherein the vane is positioned radially outward of and axially aligned with an axial path of travel of a portion of the sleeve that partially eclipses the axial extent, and is located between the sleeve and the side wall.

45. The static classifier of claim 44, wherein each of the plurality of openings has an axial extent and a circumferential extent and wherein the vane has an axial length equal to the axial extent and a circumferential arc-length equal to the circumferential extent.

46. The static classifier of claim 44, further comprising vane-actuator system in communication with the vanes.

47. The static classifier of claim 46, wherein each of the vanes being pivotally mounted on a shaft which extends through the top-plate, the vane-actuator system comprises a linkage system connected to each of the shafts and a vane actuator connected to the linkage system, the vane actuator being configured to synchronously pivot the vanes relative to the side wall of the classifier chamber.

48. The static classifier of claim 46, wherein the vane actuator comprises a lever for manual operation or a motor for electric powered operation of the vane actuator.

49. The static classifier of claim 38, wherein the sleeve is continuously circular in cross section and has an outside diameter.

* * * * *